July 10, 1923.

W. C. WILSON

INSECT CATCHER

Filed Aug. 11, 1922

1,461,169

Inventor
Walter C. Wilson

By Bacon & Thomas
Attorneys

Patented July 10, 1923.

1,461,169

UNITED STATES PATENT OFFICE.

WALTER C. WILSON, OF MONTELLO, NEVADA.

INSECT CATCHER.

Application filed August 11, 1922. Serial No. 581,097.

*To all whom it may concern:*

Be it known that I, WALTER C. WILSON, citizen of the United States of America, residing at Montello, in the county of Elko and State of Nevada, have invented certain new and useful Improvements in Insect Catchers, of which the following is a specification.

The invention relates to improvements in an insect catcher, particularly adapted for use in catching flies and other insects.

It is an object of the invention to provide an insect catcher which is adapted to support a sticky sheet of paper, commonly known as fly paper in a detachable position adjacent any suitable source of light.

The invention is based upon my observations that light always attracts insects, and in carrying out my invention I detachably position on a light a holder receiving and supporting a fly paper upon which the insects are caught when moving toward a light. From a more specific aspect, the invention comprehends an insect catcher having a suitable handle receiving an intermediate wire portion, which is formed with a resilient loop to frictionally engage an incandescent lamp socket or the like, with end portions on said wire member adapted to receive and detachably support a sheet of fly paper. The device is constructed whereby the handle acts to counterbalance the weight of the suspended paper so that the device will be properly balanced upon a light.

Figure 1:
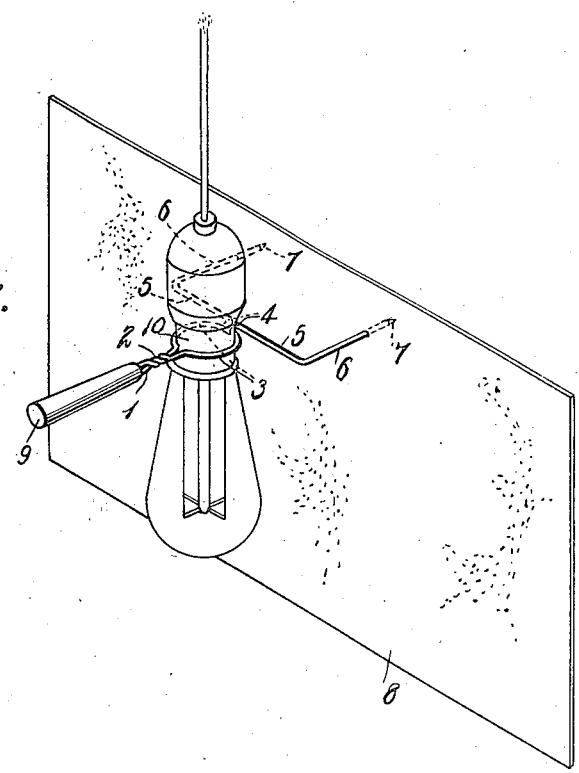
Figure 2:
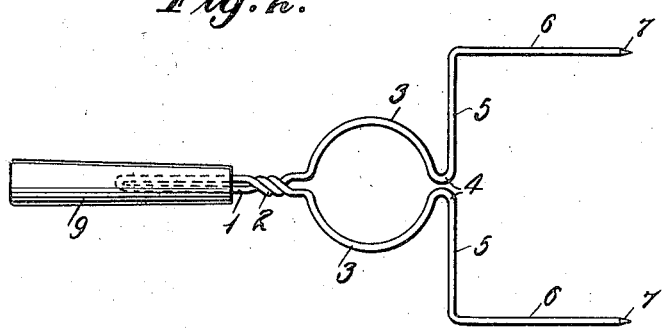

In the accompanying drawings, Figure 1 illustrates a view of the device suspended upon an incandescent light. Figure 2 is a view of the device as suspended on a light.

Referring now more particularly to the drawings wherein like reference characters indicate corresponding parts, my device comprises a support for a fly paper or other sticky trap, composed of a single strand of wire. This wire is bent intermediate its ends to form the shank 1 and is then twisted or coiled as indicated by the character 2. The strands of wire are then bowed in opposite directions, as indicated by the characters 3 forming the neck portions 4. From the neck portions 4 each strand extends laterally as disclosed by the character 5 and is provided with a forwardly projecting part 6 having sharpened ends 7 which are adapted to receive and support a fly paper 8 or a similar insect trap. The shank 1 of the support receives a wooden handle 9 which is apertured to receive said shank and constitutes a gripping portion for the paper support, and also a counterbalance when the device is in use. It will be seen that the support is constructed of a single strand of wire which is preferably bent, as indicated above, so as to provide the resilient bowed arms 3 which frictionally engage a lamp socket in a manner to be now described. Observation discloses that insects are attracted by light. I therefore place the support upon an incandescent lamp socket 10 by spreading the wire strands at the neck portions 4 apart so that the socket is gripped by the bowed portions 3 of the support. The resilient metal from which the support is formed causes the same to frictionally engage a socket or other support and securely hold the device in position. After the support has been thus mounted, I place upon the end strand 6 a sheet of fly paper or the like 8, which is supported thereon directly in the path of light and against which insects fly when attracted by the light. They are of course trapped and held on this paper and when the paper becomes completely filled so as to be no longer useful it may be removed and a new paper substituted in lieu thereof. The position of the handle 9 permits the device to be easily installed in position, and at the same time acts as a counterbalance for counterbalancing the weight of the suspended fly paper, so that the paper will normally remain in a vertical position.

While I have described a peculiar kind of wire support for the fly paper, I wish it to be understood that other types of supporting devices could be readily employed, without departing from the spirit of my invention.

Having thus described my invention, what I claim is:

1. A device of the character described, comprising a support composed of a re-bent strand of wire having a loop portion intermediate its ends, a handle carried by one end of the support and an insect catcher detachably carried by the other portion of said support.

2. A device of the character described, comprising a horizontal supporting element composed of wire, said wire being bent to form a loop intermediate its ends adapted to frictionally engage a lamp socket, a handle member at one side of said loop, the wire projecting beyond said loop at its opposite side and a sheet of insect paper having an adhesive coating detachably connected to said projecting portion of the wire.

3. An insect catching device of the character described, comprising a horizontal portion composed of a rebent strand of wire, said horizontal portion intermediate its ends being looped to receive a lamp socket, a handle at one side of said loop, the wire projecting from the opposite side of said loop terminating in sharpened end portions, and a sheet of insect catching material detachably fastened to said sharpened end portion.

In testimony whereof I affix my signature.

WALTER C. WILSON.